United States Patent [19]

Sizemore et al.

[11] 4,309,370
[45] Jan. 5, 1982

[54] MOLDING PLASTIC BODIES ON CONTINUOUS STRIP

[75] Inventors: Ronald D. Sizemore, Germanton; John J. Tucci, Winston-Salem; Albert D. Willette, Pfafftown, all of N.C.

[73] Assignee: AMP Inc., Harrisburg, Pa.

[21] Appl. No.: 81,607

[22] Filed: Oct. 3, 1979

[51] Int. Cl.³ ............................................. B29F 1/00
[52] U.S. Cl. ......................... 264/40.5; 264/40.1; 264/255; 264/308; 425/136; 425/137; 425/150
[58] Field of Search ............... 264/40.5, 255, 40.1, 264/308; 425/136, 137, 138, 150

[56] References Cited

U.S. PATENT DOCUMENTS

| | | | |
|---|---|---|---|
| 2,637,073 | 5/1953 | Walther | 264/328 |
| 2,946,088 | 7/1960 | Soderquist | 425/136 |
| 2,979,776 | 4/1961 | Morin | 425/DIG. 34 |
| 3,192,298 | 6/1965 | Fisher | 264/255 |
| 3,270,377 | 9/1966 | Parker | 22/68 |
| 3,331,904 | 7/1967 | Friedman | 264/108 |
| 3,346,574 | 10/1967 | Eyre et al. | 264/248 |
| 3,715,415 | 2/1973 | Erb | 204/25 |
| 4,008,302 | 2/1977 | Erlichman | 264/156 |

*Primary Examiner*—James H. Derrington
*Attorney, Agent, or Firm*—Gerald K. Kita

[57] ABSTRACT

Plastic molding apparatus is disclosed for forming a series of molded connector bodies along a molded strip segment. By repeating the molding cycle, an additional strip segment is simultaneously molded and joined to a previously made strip segment, so that repeated cycling of the molding machine provides a molded continuous strip interconnecting a series of molded bodies.

6 Claims, 7 Drawing Figures

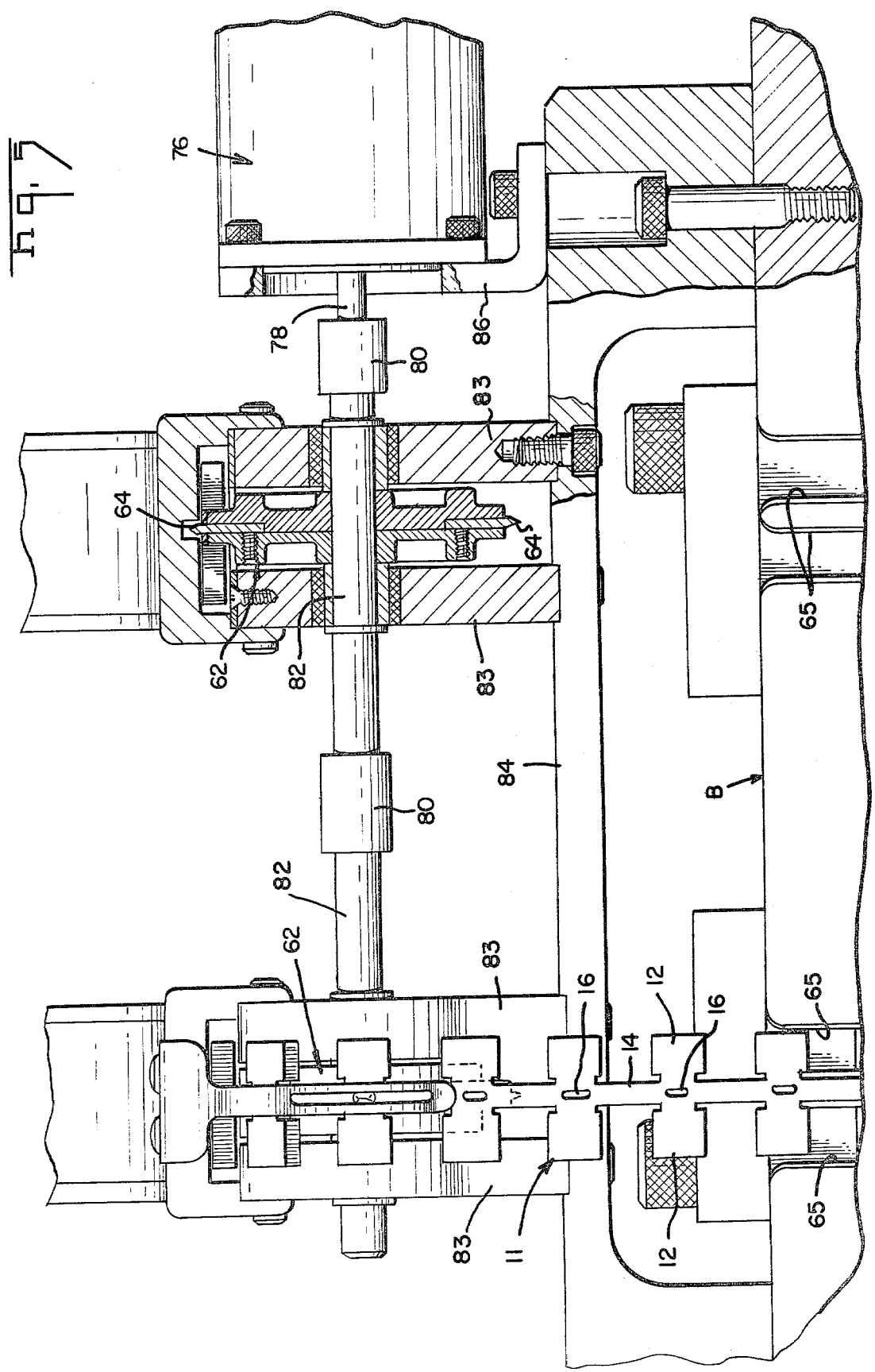

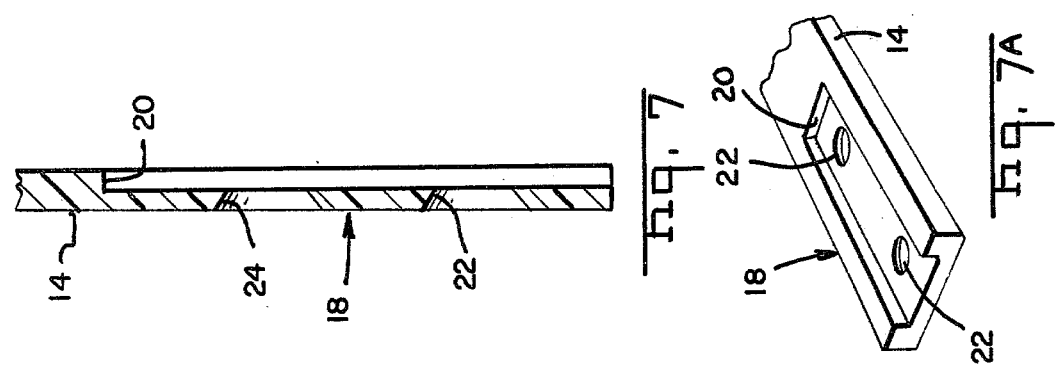
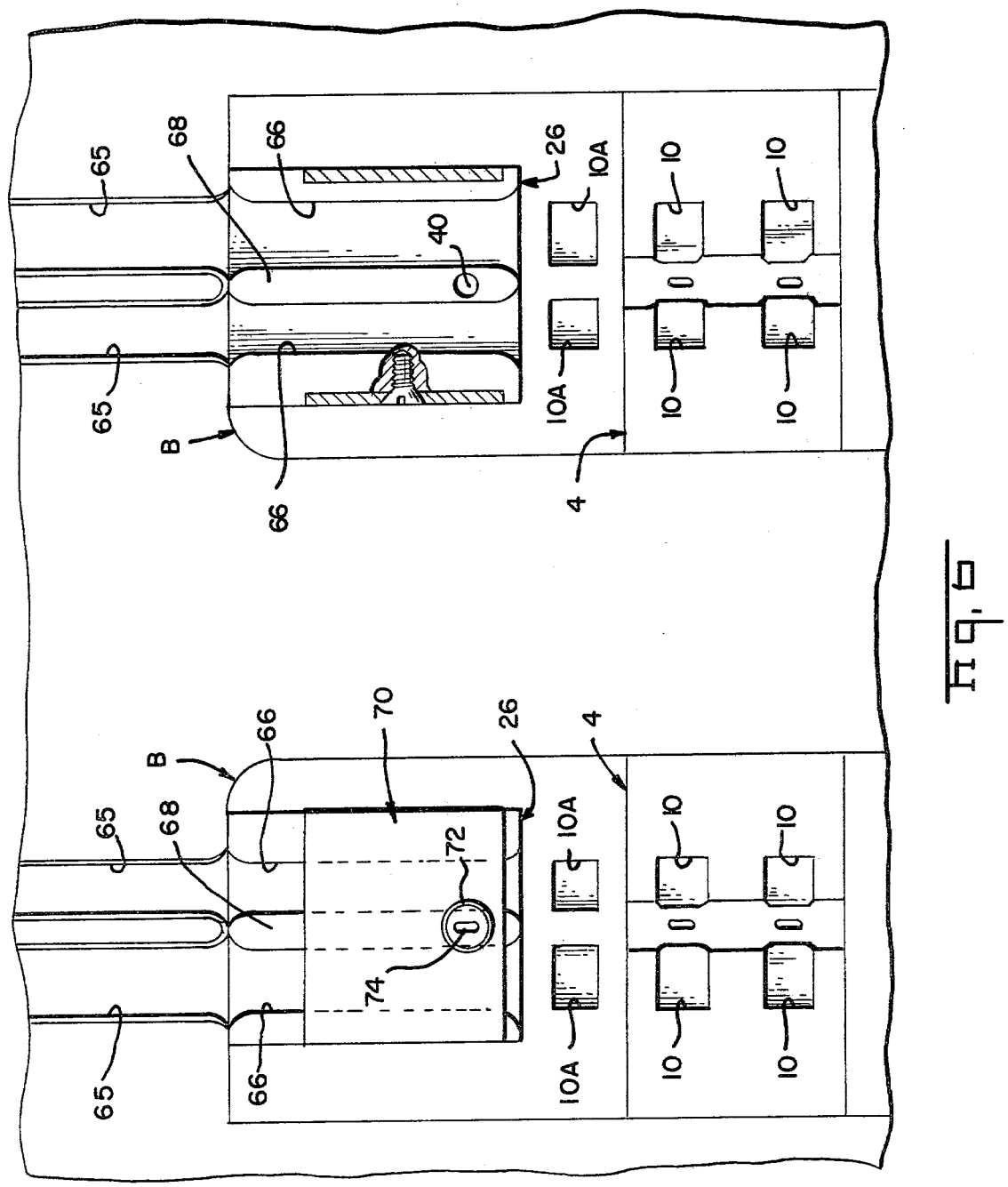

MOLDING PLASTIC BODIES ON CONTINUOUS STRIP

FIELD OF THE INVENTION

The present invention relates to plastic molding apparatus and the formation of plastic electrical connector bodies along a molded continuous strip. Further, the invention relates to apparatus for over-molding plastic products together in a continuous strip, including an indexing mechanism, electrically programmed, to remove molded product upon the completion of the molding cycle, and to position the molded product for over-molding.

BACKGROUND OF THE INVENTION

An electrical connector requires an assembly of one or more metal contacts, for electrical termination to an electrical conductor, and a plastic connector body or housing, which encircles and insulates the metal contact and a terminated portion of the electrical conductor. The electrical contacts are produced along a continuous strip which may be reeled on a spool and let out as needed for automated assembly of the contacts into the connector bodies. The connector bodies are fabricated by plastic molding apparatus. Such apparatus is not suited for producing plastic connector bodies on continuous strip. Accordingly, the bodies are molded individually or in groups along a molded strip segment of finite length. Many strip segments must be joined together to provide a continuous strip of serially arranged connector bodies suitable for automated assembly with the contacts.

Connecting strip segments together into a continuous strip was heretofore time consuming. According to one process, an operator fed individual strip segments to a heat staking machine which applied heat and pressure to remelt and join together consecutive strip segments. An improved process involves joining strip segments as they are being produced in a molding apparatus. Each time a molding apparatus is cycled to produce a strip segment, a previously made strip segment is positioned at the molding apparatus and is over-molded with the strip segment being produced.

SUMMARY OF THE INVENTION

The present invention relates to a stepping motor and matched electronic control unit for operating a molding cycle and a drive motor end which automatically withdraws molded product from a molding apparatus and positions the product for over-molding, so that repeated cycling of the molding apparatus occurs without the need for operator attentiveness to produce a continuous strip of molded products.

A typical molding cycle of the molding apparatus comprises, closing together a pair of molding dies having die cavities cooperating with one another, injecting plastics material in a molten state into the die cavities, forming the plastics material and curing the plastics material to a solid state to form a molded product, opening the dies by separation one from the other, and removing the product from the dies. The product consists of a group of connector bodies spaced along a molded strip segment. The molding cycle is repeated to provide additional connector bodies along another strip segment which is over-molded onto an end of the strip segment made during the previous molding cycle. A reeling device, driven by a reversible, precision stepping motor, removes molded product from the dies and positions each strip segment in preparation for over-molding in a repeated molding cycle. Each strip segment is molded with an interlocking structure which, when over-molded with a subsequently formed strip segment, provides a continuous strip having a uniformity which will not buckle or bind when reeled on a spool or handled in a feeding mechanism.

The molding cycle and the reeling device are automatically controlled for repeated operation without operator attention.

OJBECTS

An object of the present invention is to provide apparatus for molding a plurality of plastic connector bodies serially along an integral strip segment, formed with interlocking structure to which a subsequently molded strip segment is joined during formation thereof by repetition of the molding cycle of the apparatus.

Another object is to provide a molding apparatus with a reeling device driven by a reversible precision motor, to remove molded product from the apparatus, to position the product for over-molding, and to slacken the molded strip product to allow for movement thereof during a repeated molding cycle.

Another object is to provide plastic molding apparatus having an automatically controlled repeatable molding cycle, and further having automatically controlled apparatus, for withdrawing molded strip product, and for positioning the product for over-molding during a repeated molding cycle.

Another object is to provide a precision reeling apparatus for removing plastic molded strip product from a mold and for precisely locating the strip product for over-molding and joinder to additional molded strip product formed during a repeated molding cycle.

Another object is to provide apparatus for molding a plastic strip product and, by repeating the molding cycle, forming additional strip product while joining the same to a previously formed strip product, to result in a reelable continuous length of strip products.

Another object is to provide apparatus for molding a plurality of strip products by repeated molding operations, and for joining the strip products by over-molding, one to the end of another, during one molding operation, with the apparatus including a reversible precision reeling device which removes strip product from the molding apparatus, positions the strip product for over-molding, and provides slack in the joined lengths of strip products to allow for displacement thereof during a repeated molding cycle.

Other objects and advantages of the present invention will become apparent from the following detailed description taken in conjunction with the accompanying drawings.

DRAWINGS

FIG. 5 is a fragmentary enlarged elevation illustrating the reversible stepping motor and a pair of reeling devices for two mold cavities.

FIG. 6 is a fragmentary enlarged elevation illustrating a pair of ejector blocks for the mold cavities of the molding apparatus, with one of the blocks illustrated with a cover plate and a die button for guiding the pilot pin.

FIG. 7 is an enlarged fragmentary elevation of an end of a molded strip segment, illustrating a channel and countersink recesses for receiving over-molding by another strip segment.

FIG. 7A is a fragmentary perspective of the strip segment of FIG. 7.

DETAILED DESCRIPTION

Figure 1:
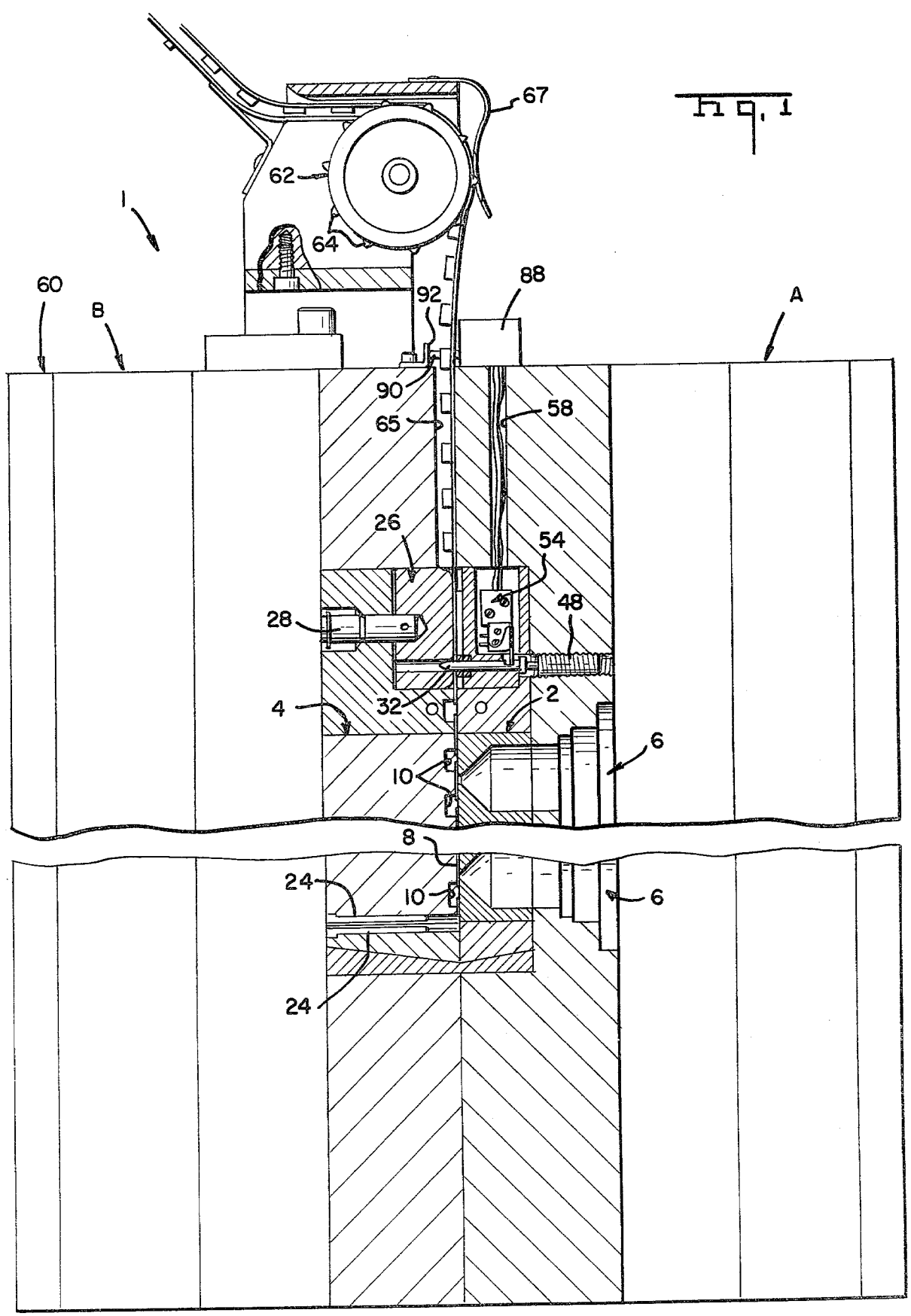
FIG. 1 is a fragmentary elevation in section of a preferred embodiment of a molding apparatus according to the invention, illustrating closed molding dies and a series of mold products on continuous strip in conjunction with a reeling device which provides slack in the continuous strip to allow movement thereof in response to closure of the mold dies during a molding cycle.

With more particular reference to the drawings there is illustrated in FIG. 1 generally at 1 molding apparatus according to the present invention comprising a mold half A provided with a molding die 2, and a mold half B provided with a die 4. Mold half A is provided with injectors 6 communicating with a die cavity 8 in the die 2. Die cavities 10 in the die 4 cooperate with the die cavity 8 when the dies are in closed cooperation. It is understood that additional cooperating die cavities 8 and 10 may be provided in the dies 2 and 4, although not specifically shown in the Figure. FIG. 5 shows the plastic product 11 formed by the die cavities 8 and 10 upon completion of a molding cycle. A plurality of connector bodies 12, formed in the die cavities 10, are serially located along an integral strip segment 14, formed in the die cavity 8. Pilot holes 16 are provided through the strip 14 and are utilized for conveying the strip segment, in a manner to be described.

The strip segment 14 is formed in a vertically elongated orientation in the mold as shown in FIG. 1. The lower most terminal end 18 of the strip segment 14 is formed with an axially elongated, side opening channel 20. On an opposite side, the end portion 18 is provided with a pair of tapered countersink recesses 22 which open into the channel 20. FIG. 1 illustrates a pair of core pins 24 in the B half of the mold. The pins 24 are actuated, according to well known principles in the plastics molding art, to enter the die cavity 8 at the appropriate time, so that plastics material forms around the pins to produce the recesses 22 in the molded product.

Figure 2:
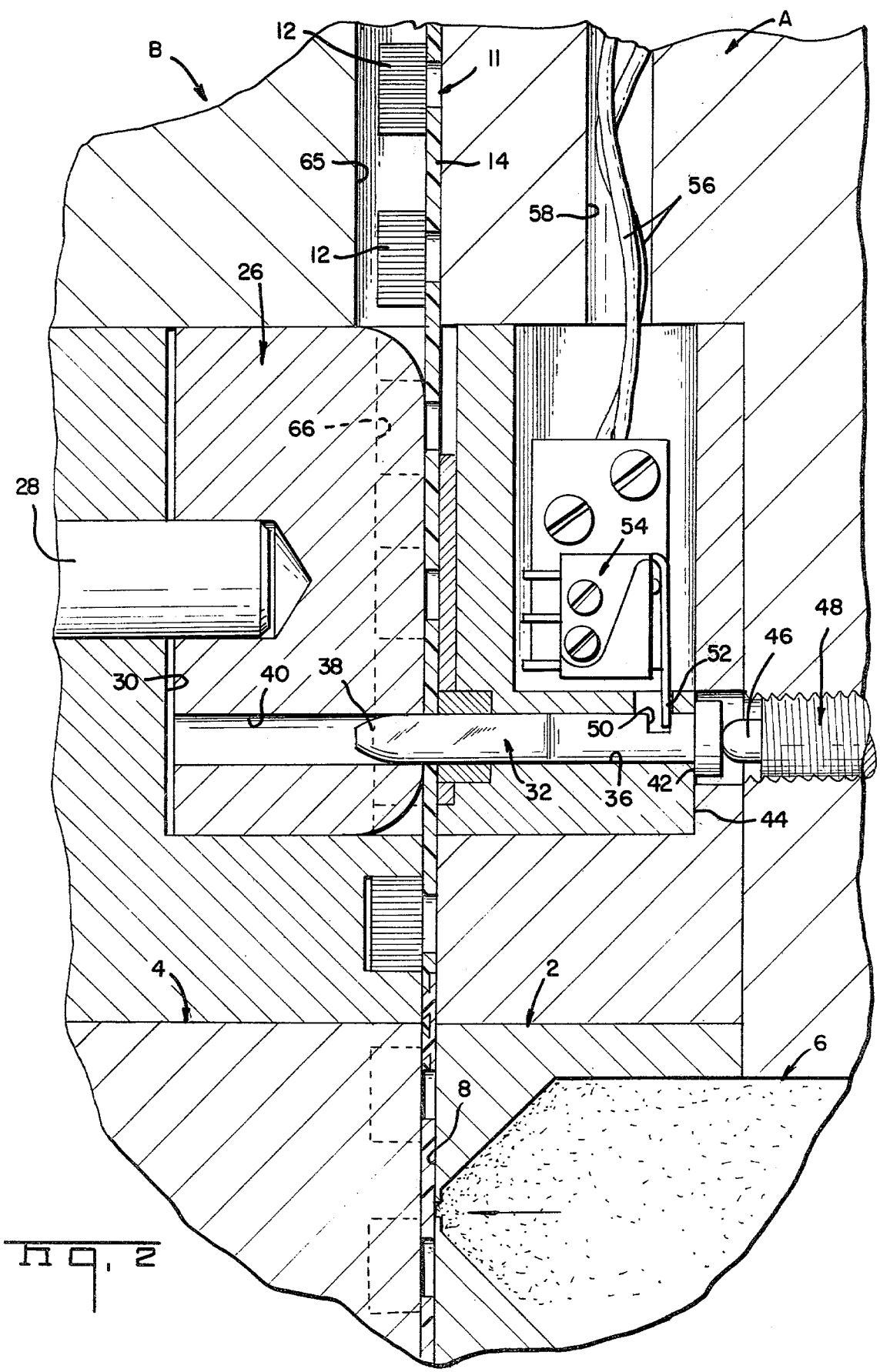
FIG. 2 is a fragmentary enlarged elevation in section of a portion of the molding apparatus, illustrating a strip segment over-molded on to a previously made strip segment, and further illustrating, a pilot pin, for aligning a previously made segment, and electrical switch controls, which prevents closure of the molding dies if the previously made segment is misaligned.

As shown in FIGS. 1 and 2, the mold half B is provided with an ejector block 26 driven by a reciprocating ejector pin 28. With the die halves A and B closed, the ejector block 26 is recessed in a side-opening cavity 30 of the mold half B, with the ejector pin 28 reciprocated toward the left. Mold half A is provided with an elongated pilot pin 32 reciprocating in a bore 36. An end of the pin 38 projects into a corresponding bore 40 of the ejector block 26. The other enlarged end 42 of the pin seats against a positioning block 44 to limit forward movement of the nose portion 38 into the bore 40. The pin is biased forwardly by a plunger 46 of a spring biasing plunger device 48 fixedly mounted in the mold half A. A notch 50 in the side of the pilot pin 32 receives therein a lever 52 of a lever actuated electrical switch 54. Electrical leads 56 of the switch 54 extend along a passageway 58 in the mold half A, and are routed to an electric control unit of the type for driving a stepping motor, supplied by Superior Electric Company, Binghamton, New York, model number MO63-FD06.

If the pilot pin 32 is prevented from entering the bore 40 during closure of the mold halves, the pin will be depressed against the spring loaded plunger 46 causing the lever 52 to pivot counterclockwise as shown in FIG. 2. An electrical signal thereby is produced by the switch 54 and supplied to the control unit to halt closure of the die halves.

Figure 3:
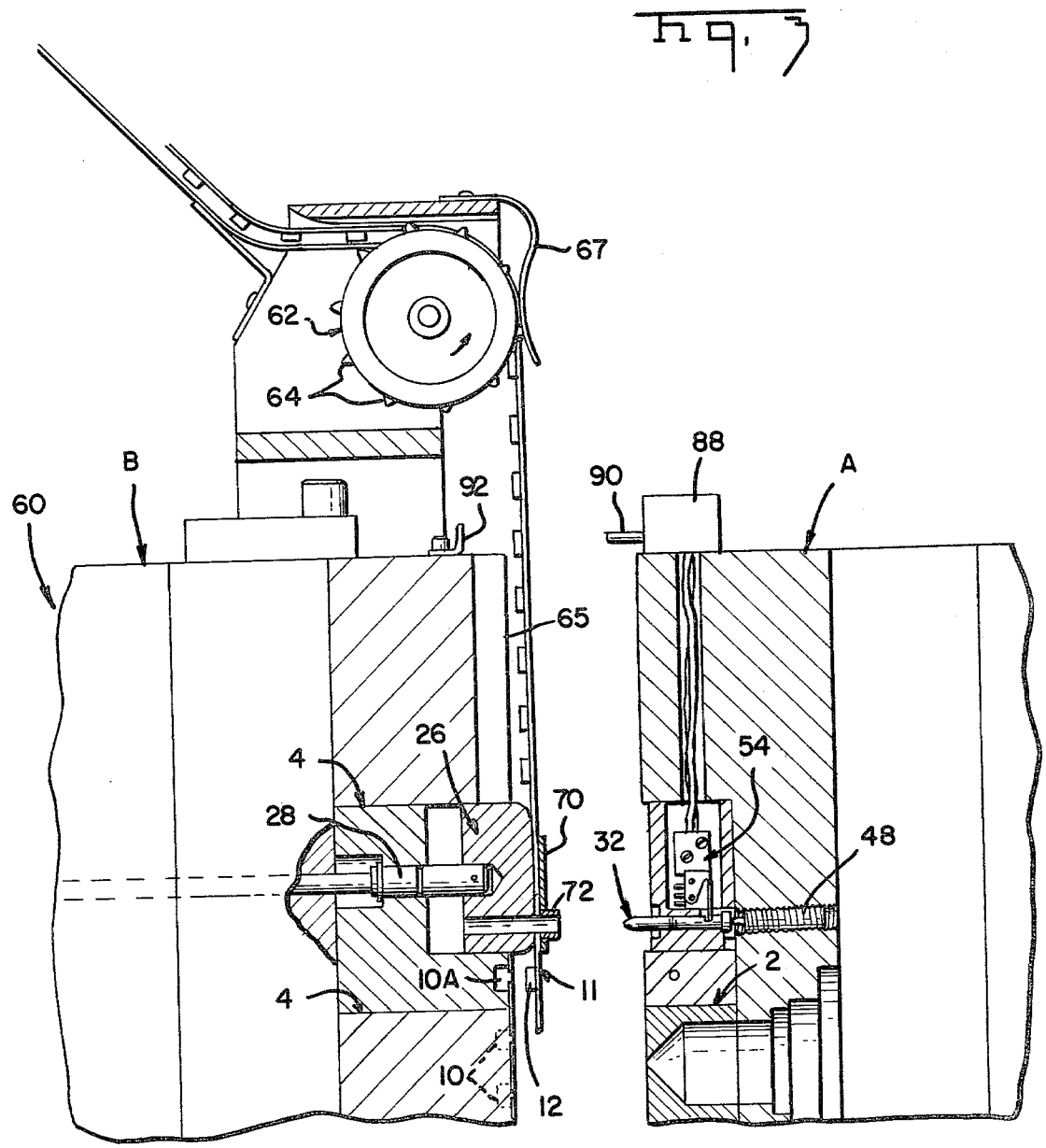
FIG. 3 is a fragmentary enlarged elevation in partial section illustrating the mold dies opened, and the molded product removed and positioned by the reeling device for a repeated molding cycle.

When the mold product has sufficiently solidified in the die cavities 8 and 10, the control unit is activated to open mold half B away from the fixed mold half A, as shown in FIG. 3. According to a well known practice in the plastic molding art, the control unit actuates a suitable motor drive of a pressure plate 60, which is reciprocated to drive the ejector pin 28 as well as additional ejector pins (not shown) to impel the solidified product outwardly of the die cavities 10 and into the space between the separated mold halves A and B. The molded product 11 is held away from the die 4 by the ejector block 26 as shown in FIG. 3. The control unit then activates a suitable drive motor to activate and rotate a drive wheel 62 counterclockwise, with teeth 64 along the circumference of the wheel engaging in the pilot holes 16 of the product 11, vertically removing the same from between the opened dies 2 and 4, and traversing the product 11 along channels 65 in the face of the mold half B. A spring finger 67 retains the product 11 against the wheel 62.

As shown in FIG. 6 the block 26 is provided with a pair of vertical channels 66 separated by a rib 68. As the product is vertically removed, the connector bodies 12 will traverse along the channels 66 while the strip segment is supported along the rib 68. In FIG. 6 a cover plate 70 overlies the passageways 66 and the rib 68, with a space between itself and the rib 68 to accommodate vertical passage of the product 11. A die button 72 having a central aperture 74 is provided in the cover plate to provide a guide for the pilot pin 32.

As shown in FIG. 3, taken in conjunction with FIG. 6, the face of mold half B is provided with additional recesses 10A located between the ejector block 26 and the die 4. The drive wheel 62 locates an end of the molded product 11, such that the lower most pairs of connector bodies 12 are located opposite the recesses 10A. During a repeated molding cycle, the mold halves A and B will close together, with the ejector block 26 becoming recessed within the face of the mold half B, thereby inserting the lower most connector bodies 12 into the recesses 10A. The pilot pin 32 will enter the die button 72, and will pass through a pilot hole 16 of the molded product 11, and then into the bore 40 of the ejector block 26. If the product 11 is misaligned, the pilot pin will impinge against the carrier strip segment 14 which covers the bore 40 and will be displaced, overcoming the biasing action of the plunger 46, as the die halves A and B close together. The switch 54 will then be actuated, due to the position of the pilot pin, to prevent closure of the mold halves. Operator attention will then be required to restart the molding cycle after making adjustments.

To achieve repeated molding cycles without operator attention, the drive wheel 62 must be driven by a precision stepping motor, as shown in FIG. 5 at 76, of the type supplied by Superior Electric Company and matched to the heretofore identified control unit. The output shaft 78 is attached by a coupler 80 to the shaft 82 on which the drive wheel 62 is secured. A pair of drive wheels 62 are shown coupled together; one for removing each of a pair of strip segments 11 produced simultaneously by a single molding cycle. A pair of bearing blocks 83 rotatably mounting each shaft 82 are mounted to a mounting flange 84, which is in turn mounted to the mold half B. The motor 76 is supported by a mounting flange 86 which is in turn secured to the mounting flange 84.

Figure 4:
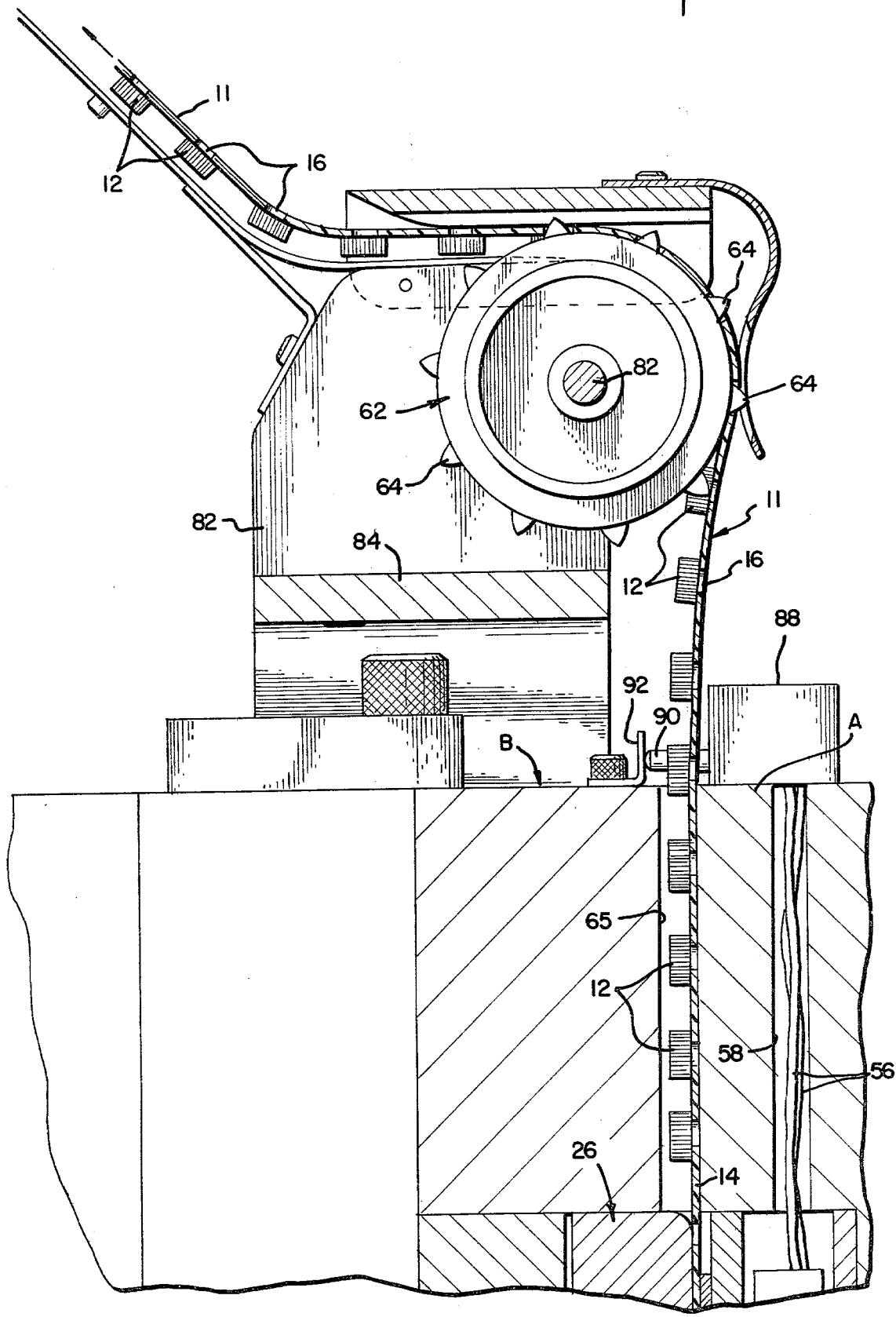
FIG. 4 is a fragmentary enlarged elevation of the reeling device and a reversible stepping motor drive which drives the reeling device to provide slack in the strip to allow movement thereof in response to closure of the mold dies during a subsequent molding cycle.

As shown in FIGS. 3 and 4, a plunger actuated, electrical switch 88 is mounted on the mold half A with the plunger 90 thereof projecting toward a strike plate 92 mounted on the mold half B. As the mold halves A and B close together, the plunger 90 will impinge against the strike plate 92, depressing the plunger and activating the switch 88 which signals the control unit to rotate the drive wheel 62 clockwise as shown in FIG. 4. The continuous strip of molded products 11 will thereby slacken to allow for movement thereof in response to movement of the mold halves as they close together during a molding cycle. The stepping motor 76 is capable of a precise amount of clockwise rotation to produce a corresponding desired slack.

Although a preferred embodiment of the present invention is disclosed and described in detail, other embodiments and modifications thereof which would be apparent to one having ordinary skill in the art are intended to be covered by the spirit and scope of the appended claims.

What is claimed is:

1. A method for molding a series of molded products in continuous strip form, comprising the steps of:
    molding a first molded product by a closed together pair of molding dies,
    separating said dies,
    ejecting said first molded product from at least one said die,
    withdrawing all but a remainder portion of said first molded product from between said dies,
    aligning said remainder portion in desired position between said dies,
    detecting misalignment of said remainder portion,
    preventing closure together of said dies when said misalignment is detected,
    closing together said dies over said aligned remainder portion,
    slackening said first molded product during closing together of said dies over said remainder portion, and
    molding a second molded product by said closed together dies while joining the second molded product integrally to said remainder portion.

2. A method for molding a series of molded products in continuous strip form, comprising the steps of:
    molding a first molded product by a closed together pair of molding dies,
    separating said dies,
    ejecting said first molded product from at least one of said dies,
    withdrawing all but a remainder portion of said first molded product from between said dies,
    penetrating a pilot means into said remainder portion,
    preventing closure together of said dies over said remainder portion if said pilot means fails to penetrate said remainder portion,
    closing together said dies over said remainder portion if penetrated by said pilot means,
    molding a second molded product by said closed together dies and joining said second molded product integrally to said remainder portion.

3. A method for molding a series of products along a continuous flexible strip, comprising the steps of:
    molding a first molded product by a closed together pair of molding dies,
    separating said dies,
    ejecting said first molded product from at least one said die,
    withdrawing all but a remainder portion of said first molded product from between said dies,
    penetrating a flexible strip portion of said remainder portion with a pilot means,
    closing together said dies over said remainder portion if penetrated by said pilot means,
    molding a second molded product by said closed together dies and joining the second molded product integrally to said flexible strip portion of said remainder portion.

4. The method as recited in claim 3, and further including the step of: Preventing closure together of said dies over said remainder portion if said pilot means fails to penetrate said remainder portion.

5. The method as recited in either of claims 2 or 3, and further including the step of: Slackening said first molded product subsequent to penetration thereof by said pilot means and prior to closure together of said dies over said remainder portion.

6. The method as recited in either of claims 2 or 3, wherein, said step of closing together said dies includes advancing said pilot means toward said remainder portion to penetrate said pilot means into said remainder portion.

* * * * *